United States Patent [19]

Siol et al.

[11] Patent Number: 5,250,623

[45] Date of Patent: Oct. 5, 1993

[54] COMPATIBLE POLYMERIC MIXTURES

[75] Inventors: Werner Siol, Darmstadt-Eberstadt; Jens-Dieter Fischer, Bickenbach; Thomas Sufke, Robdorf; Erwin Felger, Darmstadt; Klaus Frank, Muhltal, all of Fed. Rep. of Germany

[73] Assignee: ROHM GmbH, Darmstadt, Fed. Rep. of Germany

[21] Appl. No.: 721,466

[22] PCT Filed: Jan. 21, 1991

[86] PCT No.: PCT/DE91/00054

§ 371 Date: Jul. 10, 1991

§ 102(e) Date: Jul. 10, 1991

[87] PCT Pub. No.: WO91/11490

PCT Pub. Date: Aug. 8, 1991

[30] Foreign Application Priority Data

Feb. 2, 1990 [DE] Fed. Rep. of Germany ....... 4003088

[51] Int. Cl.$^5$ ..................... C08L 33/08; C08L 33/10; C08L 67/02

[52] U.S. Cl. ..................... 525/176; 525/64; 525/166; 428/483

[58] Field of Search ......................... 525/176

[56] References Cited

U.S. PATENT DOCUMENTS 3,591,659 7/1971 Brinkmann .................... 525/176

FOREIGN PATENT DOCUMENTS 0142336 5/1985 European Pat. Off. .
2316254 1/1977 France .
2105351 3/1983 United Kingdom .

OTHER PUBLICATIONS

Chemical Abstracts, Band 113, Nr. 2, 9 Jul. 1990, (Columbus, Ohio, US) siehe Seite 66, Zusammenfassung Nr. 7727c & JP, A, 01295880 (Tomoegawa Paper Co. Ltd) 29 Nov. 1989.

Primary Examiner—Patricia A. Short
Attorney, Agent, or Firm—Oblon, Spivak, McClelland, Maier & Neustadt

[57] ABSTRACT

The invention relates to compatible PM polymer blends with polyesters as mix components, which comprise
A) 0.1 to 99.9 wt % of a Pi polyester synthesized from units of formula I

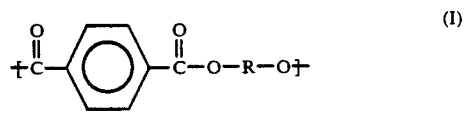

where R stands for a group —$(CH_2)_m$— or for a group

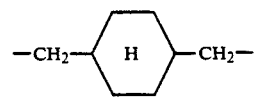

and where m stands for a number from 2 to 6, and
B) 99.9 to 0.1 wt % of a P2 polyester synthesized to 20-100 wt % from halogen-free monomers of formula II

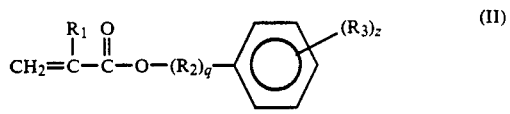

where
$R_1$ stands for hydrogen or methyl
$R_2$ stands for a spacing group having 1-6 members,
$R_3$ stands for an alkyl group, alkoxyl group or aminoalkyl- or dialkyl group having 1 to 6 carbon atoms and
q stands for zero or one and
z stands for zero, one or two.

8 Claims, No Drawings

COMPATIBLE POLYMERIC MIXTURES

OBJECT OF THE INVENTION

The invention relates to compatible polymer blends comprising polyarylacrylates and polyesters.

BACKGROUND ART

According to the general definition, "polyesters" represent macromolecular substances, which are characterized by the presence of carboxylester groups in the repeating units of the main chains (cf. H. Mark et al., Encyclopedia of Polymer Science and Technology, 2nd ed., Vol. 12, pp. 1-75, J. Wiley-Interscience 1988, R. Vieweg et al., Plastics Handbook, Vol. III, Polyester, Carl Hanser Verlag, 1973, Ullmann's Encyclopädis der Techn. Chemie, 4th ed., Vol. 19, pp. 61-81, Verlag Chemie, 1980). The manufacturing methods serve either self polycondensation of hydroxycarboxylic acids or the polycondensation of dicarboxylic acids with dihydroxy compounds. The former polymers can be reproduced with the general formula

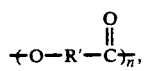

where R' stands for a suitable hydrocarbon group; the latter can be reproduced with the general formula

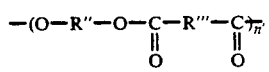

where R" stands for a suitable spacing hydrocarbon group; and R'" for the hydrocarbon group of a dicarboxylic acid; and n or n' exhibits in both cases a value corresponding to a molecular weight of the polymer of $>10\text{-}15\times10^3$. Those polymers in which R" stands for $-\text{CH}_2)_x-$ for $x = 2, 4$ or $6$, have proven to be of particular industrial importance; and specifically those polymers, wherein R" stands for $-\text{C}_2\text{H}_4-$ and R'" stands for $-\text{C}_6\text{H}_4-$ (polyethylene terephthalate, PET) and wherein R" stands for $-\text{C}_4\text{H}_8-$ (polybutylene terephthalate, PBT).

In general the polyalkylene terephthalates can be processed like a thermoplastic in injection moulding or through extrusion. Parts comprising PET are charcterized, among other things, by hardness and good abrasion resistance at high dimensional stability.

They exhibit in general a satisfactory impact strength, but only a moderate notch impact strength. Man-made fibers (polyester fibers, abbreviation PES according to DIN 60 001 T1) represent the most important area of application for linear polyesters. In addition, the use of saturated polyesters as injection moulding and extrusion moulding compounds and as film material have gained in importance (cf. kunststoffe 79, pp 925-926 (1989).

Therefore, there has been no lack of effort to improve the properties of these bulk plastics, where special stress was laid upon the improvement of the notch impact strength. A large number of patents deal, e.g., with the modification of polyesters by blending them with polyacrylates or through copolymerization of said polyesters.

A large number of patents are applicable to the practical goal of impact modification of polyesters, where one could resort to known ideas. Glass fiber reinforced PBT can be blended, for example, advantageously with methacrylate-methyl methacrylate copolymers (JP-A 74 90 345; Chem. Abstr. 82, 99221a). Improved mouldability is claimed, e.g., for blending PET with a (partially) saponified methyl methacrylate-methylacrylate copolymer (cf. JP-A 84 47 256; Chem. Abstr. 101, 131 801 p). The oil resistance of a mixture comprising >50 parts by weight of PMMA and <50 parts by weight of saturated polyester such as PET is underscored in JP-A 84 152 945 (Chem. Abstr. 102, 79 763g). Blending polyalkylene terephthalate with 5-30 wt % of an acrylate graft polymer such as butyl acrylate-methyl methacrylate graft copolymer (cf. DE-A 33 28 568) serves to improve the notch impact strength.

An improvement in the notch impact strength is also achieved according to EP-A 50 265 by blending thermoplastic polyesters with core shell polymerizates, comprising a tough acrylate phase as core and a hard shell comprising PMMA or styrene.

In connection with a silane coupling component, blends of PBT and polyacrylates have, according to EP-A 190 030, good impact strength and extensibility. Observed is a lower moulding temperature.

A blend of PET and polyglycidyl methacrylate and-/or fatty acid polyester is known from JP-A 87 149 746 (Chem. Abstr. 108, 7017t). Graft copolymers of tetrahydrofurfuryl esters of (meth)acrylic acid on poly-α-olefins are also described as additives to polyesters (cf. DE-A 35 25 253). According to JP-A 79 129 050, ethylacrylate-ethylene coplymers represent master batches to incorporate pigments into polyester (Chem. Abstr. 92, 77 480p).

The effect of an addition of PMMA on the crystallization behavior of PET was investigated by V. M. Nadkarny et al. (Polym. Eng. Sci., 1987, 27 (6) 451-457). Practical application as oven-proof pots is projected for crystallizable polyethylene terephthalate, which is modified with 4-29 wt % of a core-shell polymer, for example synthesized from allyl methacrylate butyl acrylate butylene glycol diacrylate as core and polymethyl methacrylate as shell, and with 0-14.5 wt % of polycarbonate (cf. U.S. Pat. No. 4,713,268). Other modification methods avail themselves to an allyl methacrylate-butyl acrylate-methyl acrylate copolymer, on which the methyl methacrylate was grafted (JP-A 82 137 347; Chem. Abstr. 98, 55092k).

The issue concerning polymer compatibility in the blends is not explicity investigated in the prior art, but the indicated applications or the reported flattening effects show that they are incompatible polymer blends.

Thus, in the JP-A 76 75749 (Chem. Abstr. 85, 124 964s) a pearlescence effect for blends comprising, for example, 70 parts by weight of PMMA and 30 parts by weight of PBT, is reported. As an index for polymer incompatibility, the reported pearlescence effect for cosmetic containers made of PET and PMMA must also be evaluated (cf. JP-A 82 15929; Chem. Abstr. 96, 200978u). The same also applies to blends of PET and methylacrylate-methyl methacrylate copolymers (cf. JP-A 81 161472; Chem. Abstr. 96, 124179s; JP-A 82 63353; Chem. Abstr. 97, 183608z; JP-A 82 968178, Chem. Abstr. 97, 199244p; JP-A 82 98327, Chem. Abstr. 97, 199245q). With the addition of polyacrylates to polyesters a flattening effect in films is achieved (EP-A 184 028). Even the JP-A 78 133254 (Chem. Abstr. 90, 122 459k) reports about pearlescence effects of blends of acrylate copolymers with acrylonitrile and diene-rubber-graft polymers and aromatic polyesters. For this reason, incompatibility must also be assumed for the iridescent ternary polymer blends comprising PET, polystyrene, and PMMA according to JP-A 80 03 471 (Chem. Abstr. 92, 199 282w).

The impact modification of polybutylene terephthalate plastics, whose heat resistance and weather resistance are shown by D. Rempel in Kunstoffe, 1986, (76), pp. 900–904. Butadiene-styrene-rubbers grafted, for example, with styrene and methyl methacrylate are recommended as impact modifiers (cf. NL-A 73 12 510, DE-A 30 04 942). Similarly investigations were made with acrylate-modified styrene-acrylonitrile copolymers as impact resistant components (e.g., DE-A 27 58 497; JP-A 84 11347, Chem. Abstr. 100, 211063u). In other documents the addition of ethylene-(meth)acrylic acid ester-glycidyl methacrylate copolymers (cf. PCT-Int. Appl. WO 85 03 718) or of ethylene-glycidyl methacrylate-vinyl acetate copolymers (JP-A 78 117 049, Chem. Abstr. 90, 55830j) is reported.

In addition to impact modifiers, polycarbonate is also added as another mix component for polyester (cf. JP-A 76 44160, Chem. Abstr. 85, 47657g; PCT Int. Appl. WP 80 00 972). For fire-proofing, halogen-containing groups, in particular halogenated aromatics, have been introduced into the polymers. Thus, the addition of poly(pentabromobenzyl)acrylates (JP-A 84 06248, Chem. Abstr. 100, 193020w; JP-A 84 20351, Chem. Abstr. 101, 8220w, JP-A 84 20350, Chem. Abstr. 101, 24542h; JP-A 84 11351, Chem. Abstr. 101, 92117j) is recommended. Reference has already been made to the obvious incompatibility (=immiscibility) of polyesters with poly(meth) acrylates. In the case of impact modifiers, the elastomer phase is linked to the polyester phase via the PMMA, or the styrene-MMA-copolymer or via the styrene-acrylonitrile polymer even though there is no compatibility between the polyester and this polymer.

In order to link, reactive components such as glycidyl methacrylate must generally be copolymerized. In the literature miscibility is noted for the systems-poly-ethylene-adipate-PMMA and poly-ethylene sebacinate-PMMA due to the observed depression of the melting point (cf. M.Natov et al., J. Polym. Sci., Part C16, p. 4197 (1968). Also from an industrial point of view, the incompatible blends of polyester with other polymers play the dominant role.

PROBLEM AND SOLUTION

From a number of points of view it is advantageous to have compatible polymer blends. They ensure the homogensity of the material and thus a specific constancy in material data. They open favorable possibilities for the modification of processing conditions and for the effect on material properties.

It has now been found that blends comprising halogen-free polyaryl(meth)acrylates and polyesters exhibit excellent compatibility, where the aryl group can be substituted with alkyl groups or especially with alkoxyl or aminoalkyl groups. The alkyl group can have up to 6 carbon atoms. The invention relates in particular to PM polymer blends formed by A) 0.1 to 99.9 wt %, in particular 1 to 99, preferably 10 to 90 wt % of a P1 polyester synthesized from units of formula I

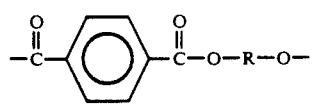

where R stands for a group —(CH$_2$)m— or for a group

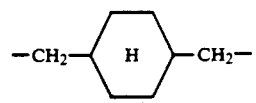

and where m stands for a number from 2 to 6, and
B) 99.9 to 0.1 wt %, in particular 99 to 1, preferably 90 to 10 wt % of a P2 polymer synthesized to 20–100 wt % from halogen-free monomers of formula II

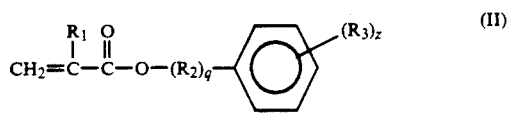

where
R$_1$ stands for hydrogen or methyl,
R$_2$ stands for spacing group having 1–6 members, preferably selected from the group of alkylidenes having 1 to 6 carbon atoms in the chain and the group —(CH$_2$)p—O—, where q denotes zero or 1 and p denotes a number from 2 to 6,
R$_3$ stands for an alkyl group, alkoxyl group or aminoalkyl- or dialkyl group having 1 to 6 carbon atoms and z stands for zero, 1 or 2.

The end saturation of the units of formula I corresponds to that of the conventionally available, in particular to that of commercial products. They are preferably the hydroxyalkylidene unit from excess diol or the acidic groups from excess dicarboxylic acid. In addition, monofunctional reagents can also be added to terminate the chain, for example alkoxyl functions. Especially preferred are P2 polymers, which are synthesized to 40–100 wt %, in particular preferably to 51–99 wt % from monomers of formula II. The sum of the components A) and B) in the PM polymer blends amounts in general to 100 wt %.

THE POLYESTERS

The polyesters that are to be used within the context of the present invention and can be processed preferably like a thermoplastic are generally synthesized to at least 70 wt % and preferably up to 100 wt %—minus the terminal groups—from the units according to formula (I). The residual monomer units comprise either mono-hydroxycarboxylic acids such as p-hydroxybenzoic acid or preferably units of the type

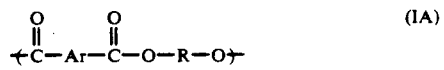

where R exhibits the aforementioned meanings and where Ar stands for 1,3-phenylidene or naphthylidene.

Especially preferred are polyesters of terephthalic acid, which exhibit units containing less than 10 wt % of iso-phthalic acid. Especially preferred are polyesters, which are synthesized exclusively from repeating units of formula (I), in particular from the PET and PBT type.

The polyesters exhibit in general a molecular weight Mw of $>10\times10^3$ and up to approximately $500\times10^3$, where the molecular weight is usually determined indirectly by the viscosity of the solution $\eta$ sp/c (in cm/g)—measured with a capillary viscosimeter. Preferably polyesters of formula I are used, in particular polyethylene terephthalate and polybutylene terephthalate but also, e.g., copolyester on the basis of 1,4-bis-(hydroxymethyl)cyclohexane, terephthalic acid and isophthalic acid are suitable. Emphasis is placed on the fact that the polyesters to be use are usually commercial products. The polyesters can also contain as an option known additives, e.g., nucleating agents, pigments, flame retardants (cf. Ullmann, loc. cit).

THE POLYARYL(METH)ACRYLATES

As defined by the present invention, halogen-free polyaryl(meth)acrylates form the second polymer component of the PM polymer blends. Suitable monomers are well-known. Examples thereof are phenyl(meth)acrylate and its alkyl-, alkoxy-and alkylamine-substituted derivatives having 1 to 6 carbon atoms in the alkyl groups, in particular the p-methoxyphenyl(meth)acrylate. Furthermore, the N,N-dialkylamino-substituted phenyl(meth)-acrylates, thus, e.g., the p-N,N-dimethylaminophenylmethacrylate. Of interest, however, are also the (alkyloxy)phenylmethacrylates that are not directly connected to the (meth)acryloyl group; see, e.g., the phenoxyethyl methacrylate ($R_2$=—$CH_2$—$CH_2$—O—). Special stress, however, must be laid on alkoxyphenyl(meth)acrylates, in particular methoxyphenyl- and the phenyl methacrylate.

The polyaryl(meth)acrylates can also be synthesized from several kinds of monomers, preferably those of formula II. Provided P2 polymers are not synthesized exclusively from monomers of formula II, suitable comonomers are other esters of (meth)acrylic acid, in particular those of formula III

where
- $R_4$ stands for an aliphatic group having 1 to 12 carbon atoms, or for an alkyl group substituted with at least one X group and having 2 to 8 carbon atoms, where X stands for an —OH, —$OR_5$ or a —$NR_6R_7$ group,
- where $R_5$ stands for an alkyl group having 1 to 6 carbon atoms or an alkoxy group having 1 to 6 carbon atoms,
- and $R_6$ stands for hydrogen or an alkyl group having 1 to 6 carbon atoms,
- and $R_7$ stands for an alkyl group having 1 to 6 carbon atoms or where $R_6$ and $R_7$ form a five or six-membered, preferably saturated ring with or without the inclusion of another nitrogen or an oxygen, or styrene, p- or $\alpha$-methyl styrene.

Especially preferred are those P2 polymers containing less than 10 wt %, especially less than 1 wt % and, in particular preferably 0 wt % of monomers with epoxy groups (like glycidyl methacrylate) or acid groups like (meth)acrylic acids.

P2 homo- or copolymerizates are manufactured according to known methods. (Cf. H. Rauch-Puntigam, Th.Völker, Acryl- and Methacryl Compounds, Springer Verlag, 1967). Even if frequent manufacture through anionic polymerization or group transfer polymerization (see also O. W. Webster et al., J. Am. Chem. Soc., 105, 5706 (1983)) is possible in principle, the preferred method of manufacture is still radical polymerization. In so doing, both substance and solution or emulsion polymerization can be conducted.

With the radical polymerization process, the typical radical initiators, for example peroxidic, in particular organic peroxy compounds or azo compounds, are preferably used in quantities ranging from 0.01 to 1 wt % (based on the monomers). The usual sulfur regulators in the tried concentrations, e.g., in quantities ranging from 0.01 to 2 wt % (based on the monomers) can be used as the regulators.

The molecular weight M of the P2 polymerizates is usually above 3,000, generally in the range of 10,000 to 2,000,000, preferably 20,000 to 300,000 (light scattering). When selecting the monomer components to be added as the comonomer for P2, care must be taken that the glass temperature Tg of the resulting polymerizate does not have a limiting effect on the industrial applicability of the total PM system.

MANUFACTURE OF THE PM BLENDS

The compatible PM blends can be manufactured by various methods; they are, e.g., produced through intensive mechanical mixing of the P1 and P2 components in the melt, in the extruder, kneader, etc. (Cf. Kirk-Othmer, "Encyclopedia of Chemical Technology", 3rd ed., Vol. 18, pp. 443-478, J. Wiley, 1982).

The melt is mixed in a suitable, generally relatively high temperature range, for example, at 220° to 320° C., as a rule of thumb at approximately 280° C.

The result is routinely a glass-clear melt and in particular in all applied proportions of the polymer components, according to observations to date. Usually the melt solidifies so as to be crystalline when cooling. The formation of a glass-clear melt can be evaluated as a reliable index for the presence of a single homogeneous phase in the molten state.

ADVANTAGEOUS PROPERTIES OF POLYARYLACRYLATE AND POLYESTER BLENDS

First of all, the polyester-polyarylacrylate blends of the invention are compatible, i.e. the blends of these polymers yield a homogeneous melt. Thus, there is the possibility of adding the polyarylacrylate as a processing aid for the polyester (in particular for polyethylene terephthalate and polybutylene terephthalate). Thus, primarily high-molecular polyarylacrylate having a molecular weight of Mw=100,000–2,000,000, in particular 300,000–1,200,000, can be added as the extrusion aid for polyester. Usually such polyester and polyarylacrylate blends contain 0.5–20, in particular 1–10 wt %, of polyarylacrylate.

The wider processing play of the blends as compared to pure polyester also permits blends to be thermoformed, in particular blow moulded or deep drawn.

Another advantage of the blends, in particular when used in very high-molecular polyarylacrylates, can be seen in the manufacture of foams. Thus, using the usual blowing agents, polyester/polyarylacrylate blends with 3–30 wt % of polyarylacrylate, in particular 5–20 wt % of polyarylacrylate/polyester foams should be accessible.

The good compatibility of the polyarylacrylate with the polyester also permits good adhering layers of polyarylacrylate to be produced on polyester. Thus, for example, composite systems adhering well one on top of the other and made of polyester and polyarylacrylate can be manufactured. In addition, polyester can be lacquered, for example, with polyarylacrylate. Coextrusion and/or co-injection moulding deserve special interest. Of special interest are such polymer compositions in which a moulded body (e.g. a sheet or film) made of polyester is enclosed with a jacket of polyarylacrylate. Preferably the polyarylacrylate used as the jacket contains well-known UV protecting agents in proportions ranging from 0.1 to 10 wt % and thus protects the total composition against weathering.

Compared to incompatible polymer compositions, these polymer compositions of polyester and polyarylacrylate have the following advantages: a) better adhesion of the layers on one another, b) no waste problems, since the waste pieces can be reincorporated without any problems owing to the good compatibility.

Of special interest are also PM' polymer blends, which, in addition to the polyarylacrylate and the polyester, also contain 1–40 wt % of another P3 polymer, where what matters is that the P3 polymer is compatible neither with the P1 polymer nor the P2 polymer nor the PM polymer blend.

Especially preferred are PM' blends comprising 60–99 (70–95) wt % of PM and 40–1 (30–5) wt % of a P3 polymer, which exhibits a glass temperature $<0°$ C. and is at least partially (generally at least 5 wt %) covalently bonded to polyarylacrylate. In general P3 is cross-linked and represents a rubber phase. Thus, P3 is, for example, polybutadiene, polyisoprene or another polyolefin, e.g., EPDM or a polyacrylate, e.g., polyethyl-, polybutyl- or poly-2-ethylhexylacrylate. In an especially preferred case one starts from a core-shell-latex, where the latex core (diameter 100–500 nm) is made of elastomers, e.g., cross-linked polybutadiene or cross-linked polybutyl acrylate. A shell made of polyarylacrylate is grafted on this core. (For graft polymerization cf. Houben-Wayl, Methods of Org. Chemistry E20, part 1, p. 626 f, Georg-Thieme-Verlag, 1987)

Such core-shell lattices can be incorporated as impact modifiers for the polyesters following removal of the water, e.g., through spray drying. In so doing, the elastomer (e.g. the polybutyl acrylate) is bonded to the polyester via the polyacrylate. Such polymer blends can be processed quite well and improve especially the notch impact strength of the polyester.

The following examples serve to explain the invention (where the symbolic denotations refer to formula II).

The viscosity number J (ml/g) is determined in accordance with DIN 51 562, parts 2 and 3 and DIN 7745, part 2.

EXAMPLES

Example 1

($R_1=CH_3$, q=zero, $R_3$=hydrogen, m=2)

50 parts of polyethylene terephthalate (Aldrich, inherent viscosity: 0.7) are mixed with 10 parts of polyphenyl methacrylate (J=46 ml/g) in a laboratory compounder at 280° C. The result is a glass-clear, compatible melt, hardening into a crystalline state when cooling.

Example 2

($R_1=CH_3$, q=zero, $R_3$=hydrogen, m=4)

50 parts of polybutylene terephthalate (Aldrich, no. 02123 KL) are mixed with 10 parts of polyphenyl methacrylate (J=46 ml/g) at 280° C. The result is a low viscosity, glass-clear, compatible melt, hardening into a crystalline state when cooling.

Example 3

Blending according to example 2 is repeated, but a different mixing ratio is selected: 50 parts of polybutylene terephthalate, 20 parts of polyphenyl methacrylate. This melt, too, is compatible.

Example 4

($R_1=CH_3$, q=zero, $R_3=-O-CH_3$, Z=1, m=2)

50 parts of PET are mixed with 5 parts of poly-p-methoxyphenyl methacrylate in a laboratory compounder at 280° C. The result is a glass-clear, compatible melt.

Examples 5–7

50 parts of PET are mixed with 10, 20, 30 parts of poly-p-methoxyphenyl methacrylate. A glass-clear, compatible melt is always obtained.

Example 8

Synthesis of poly-p-methoxyphenyl methacrylate 250 g of methoxyphenyl methacrylate are dissolved while heating in 375 g of toluene; it is filtered. Following addition of 0.25 g of dodecyl mercaptane and 0.125 g of tert. butyl perneodecanoate (dissolved in 10 g of toluene), the mixture is stirred at 80°–85° C. for 4 hours under protective gas ($N_2$). Following cooling to room temperature, the polymer is precipitated in methanol and dried under vacuum. The result is a powdery polymer (J=27.4 ml/g).

Example 9

50 parts of PET are mixed with 10 parts of a copolymer comprising phenyl methacrylate and styrene in a laboratory compounder at 280° C. The result is a glass-clear, compatible melt.

Example 10

Synthesis of copolymers comprising phenyl methacrylate and styrene 50 g of styrene and 150 g of phenyl methacrylate are dissolved in 200 g of toluene; it is heated to 70° C., coated with an inert protective gas ($N_2$); 1 g of tert. dodecyl mercaptane and 1 g of dilauryl peroxide (dissolved in 10 g of toluene) are added. The mixture is polymerized at 70° C. for 3 hours, cooled, and the polymer is isolated by precipitation in methanol. Following drying under vacuum, a white powder is obtained (J=46.1 ml/g).

Example 11

Comparison Example 50 parts of polybutylene terephthalate are mixed with 5 parts of polystyrene (PS 158K of BASF) at 280° C. The result is a cloudy, incompatible polymer melt.

Example 12

Synthesis of a high-molecular polyphenyl methacrylate by emulsion polymerization In a 3 liter Witt jar with condenser, stirrer, thermometer and inert gas delivery tube (nitrogen)
  600 g of phenyl methacrylate
  900 g of water
  2 g of emulsifier (nonyl phenyl, converted with 6 mole of ethylene oxide, sulfated, sodium salt)
are emulsified at 500 rpm (for 2 minutes), then the speed of the stirrer is decreased to 150 rpm; 2 ppm of $FeSO_4$ (based on the monomer) and 0.4 g of potassium peroxodisulfate are added and heated to 40° C. As soon as the internal temperature reaches 40° C., the polymerization is started by the addition of 0.33 g of $N_2S_2O_5$ (in 5 g of water). In the course of polymerization, the internal temperature rises to approximately 60° C. (bath temperature: 43° C.). After approximately 1½ hours the mixture is cooled to room temperature.

To obtain the polymerizate solid, the dispersion is frozen (−15° C.) and thawed in hot water. The solid obtained is filtered off and dried under vacuum at 90° C. (J=280 ml/g).

Example 13

Synthesis of a high-molecular copolymer by emulsion polymerization

The process is analogous to that in example 12, but other initial weights are selected
  800 g of phenyl methacrylate
  200 g p-methoxyphenyl methacrylate
  1,500 g of water
  3.3 g of $C_{15}$ parafin sulfonate, sodium salt Following emulsion at 500 rpm and addition of 2 ppm of $FeSO_4$ and 0.67 g of KPS, polymerization is started at 50° C. by the addition of 0.33 g of $N_2S_2O_5$. Following completion of polymerization, the dispersion is cooled to room temperature and frozen in order to obtain the polymerizate solid and thawed again in hot water (freezing coagulation).

The solid is filtered, washed multiple times and subsequently dried under vacuum at 90° C.
  J=298 ml/g

Example 14

Coating of polybutylene ephthalate with the polymers according to examples 8, 12, and 13

Injection moulded sheets (3 mm thick) made of PBT (Vestodur 1000(®)) of Hüls AG) are coated with approximately 10–20% solution of the polymers according to examples 8, 12 and 13 in methyl pyrrolidone (teflon knife, wet layer thickness: 120 μm, thickness of the dried film: 12–25 μm and subsequently dried at a raised temperature (75° C. under vacuum). Some samples are also heated at 200° C. for one hour.

Following cooling, the adhesion of the layer on the PBT is determined according to DIN 53151.

Example 15

PBT with a layer of poly-p-methoxyphenyl methacrylate (polymer according to example 8)
  Measurements of a sample dried at 75° C.
  Tesa test: 0% break
  Cross hatch adhesion test according to DIN 53151 with subsequent Tesa test: 0% break
  Measurement of a sample heated at 200° C.
  Cross hatch adhesion test according to DIN 53151 with subsequent Tesa test: 0% break

Example 16

PBT with a layer of polyphenyl methacrylate (polymer according to example 12)
  Measurement of a sample heated at 200° C.
  Cross hatch adhesion test according to DIN 53151 with subsequent Tesa test: 0% break

Example 17

PBT with a layer of the polymer according to example 13
  Measurement of a sample heated at 200° C.
  Cross hatch adhesion test according to DIN 53151 with subsequent Tesa test: 0% break Polymers according to examples 12 and 13 show excellent adhesion on PBT.

Example 18

(Comparison Example)

The experiment is repeated according to example 14 with polymethyl methacrylate as the coating material (plexiglas ®8N of Röhm)
  Measurement of a sample dried at 75° C.
  Tesa test: 0% break
  Measurement of a sample heated at 200° C.
  Cross hatch adhesion test according to DIN 53151 with subsequent Tesa test: 100% break The polymethyl methacrylate shows no adhesion at all on PBT.

Example 19

(Manufacture of a Composite System by Press Moulding)

0.24 g of finely ground polymerizate according to example 8 is applied on a PBT sheet that is 3 mm thick and 24 cm² large and press moulded at 175° C. (pressure: 4 KN/cm², press moulding duration: 5 minutes). After cooling, a highly lustrous composite sheet made of PBT with a cover layer of poly-p-methoxymethacrylate is obtained. Cross hatch adhesion test according to DIN 53151 with subsequent Tesa test: 0% break.

We claim:
1. Compatible polymer blends with polyesters as mix components, wherein said polymer blends comprise
  A) 0.1 to 99.9 wt. % of a halogen-free polyester synthesized from units of formula I

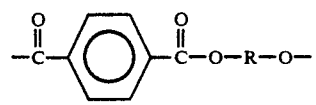

where R stands for a group —$(CH_2)_m$— or for a group

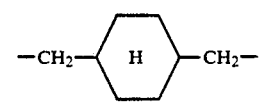

and where m stands for a number from 2 to 6, and
  B) 99.9 to 0.1 wt. % of a halogen-free polyaryl(meth)acrylate synthesized from 20–100 wt. % from monomers of formula II

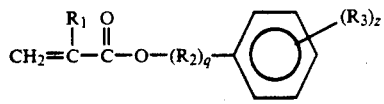

where $R_1$ stands for hydrogen or methyl, $R_2$ stands for a spacing group having 1-6 members, $R_3$ stands for an alkyl group, alkoxyl group or aminoalkyl- or dialkyl group having 1 to 6 carbon atoms, q stands for zero or one and z stands for zero, one or two.

2. Compatible polymer blends, as claimed in claim 1, wherein $R_2$ is selected from the group comprising alkylidenes having 1 to 6 carbon atoms in the chain and the group —$(CH_2)pO$—, where p stands for a number from 2 to 6.

3. Compatible polymer blends, as claimed in claim 1, wherein the said polyester is selected from the group of polyethylene terephthalates and polybutylene terephthalates.

4. The compatible polymer blend of claim 1 comprising 10-90 wt. % of said polyester and 90-10 wt. % of said polyaryl(meth)acrylate.

5. The polymer blend of claim 1, wherein $R_2$ is an alkylidene having 1-6 carbon atoms.

6. The polymer blend of claim 1, wherein said polyaryl(meth)acrylate is synthesized to 51-99 wt. % from monomers of formula II.

7. The polymer blend of claim 1, wherein said polyaryl(meth)acrylate is synthesized to 100 wt. % from monomers of formula II.

8. The polymer blend of claim 1, wherein the sum of component A) and B) is 100 wt. % of said polymer blend.

* * * * *